United States Patent [19]

Diener et al.

[11] Patent Number: 4,893,783

[45] Date of Patent: Jan. 16, 1990

[54] TREE AND TREE STUMP REMOVAL APPARATUS AND ASSOCIATED METHOD

[76] Inventors: Robert G. Diener, 1287 Woodruff Pl., Morgantown, W. Va. 26505; Ian R. Domigan, Lincoln Agricultural College, New Zealand

[21] Appl. No.: 303,037

[22] Filed: Jan. 26, 1989

Related U.S. Application Data

[63] Continuation of Ser. No. 66,131, Jun. 24, 1987, abandoned.

[51] Int. Cl.⁴ .................................................. B66F 1/08
[52] U.S. Cl. ........................................... 254/1; 37/2 R; 144/2 N; 144/193 A; 144/366; 254/30; 254/132
[58] Field of Search ........................ 254/1, 30, 93, 278

[56] References Cited

U.S. PATENT DOCUMENTS

| | | |
|---|---|---|
| 226,884 | 4/1880 | Schmaly . |
| 508,221 | 11/1893 | Hill ................................. 144/193 A |
| B 526,387 | 6/1968 | Fleming ............................... 254/30 |
| 992,419 | 5/1911 | Gordon ............................. 144/2 N |
| 1,101,899 | 6/1914 | Betten ............................... 144/2 N |
| 1,194,214 | 8/1916 | Morris et al. . |
| 2,704,093 | 3/1955 | Brown ............................. 144/193 A |
| 3,269,704 | 8/1966 | Pfundt .................................. 254/30 |
| 3,285,304 | 11/1966 | Fuller ............................. 144/193 A |
| 3,526,387 | 6/1968 | Fleming ............................... 254/30 |
| 3,802,663 | 4/1974 | Widegren et al. .................. 254/132 |
| 3,823,916 | 7/1974 | Shaw .................................. 254/132 |
| 3,946,988 | 3/1976 | Kehren ................................ 254/30 |
| 4,244,560 | 1/1981 | Hawkins ............................ 254/132 |

OTHER PUBLICATIONS

Advertising Flyer for Friday Tractor Co., Inc.

Primary Examiner—W. Donald Bray
Attorney, Agent, or Firm—Arnold B. Silverman

[57] ABSTRACT

A tree and tree stump removal apparatus consisting of a frame, pivotally mounted hydraulic cylinder mounted thereon, and a chain for placing around a tree or tree stump is provided. The hydraulic cylinder is pivotally mounted on the frame to provide the optimum vertical pulling force in order to quickly and effectively remove trees and tree stumps and their associated roots from the ground. An associated method for removing trees and tree stumps is also provided.

17 Claims, 4 Drawing Sheets

TREE AND TREE STUMP REMOVAL APPARATUS AND ASSOCIATED METHOD

This application is a continuation of Ser. No. 066,131, filed 6/24/87, now abandoned.

BACKGROUND OF THE INVENTION

1. Field of the Invention:

This invention relates to a tree and tree stump removal apparatus and associated method and, more specifically, to an improved tree and tree stump removing apparatus and an associated method that is capable of cleanly removing a tree or tree stump along with its roots.

2. Description of the Prior Art

One of the problems faced by orchardists, foresters, landscapers and others is the removal of trees and tree stumps. Present tree or tree stump removal methods, such as using bulldozers or backhoes, pose particular disadvantages such as a high cost, shearing of the tree stump without removing the roots, ground compaction and disturbance of a large area of soil around the tree or tree stump.

For example, an orchardist is forced to wait until a block of trees needs to be removed rather than removing one tree at a time. This is not satisfactory, because the orchardist must still maintain an unproductive tree by having to mow and spray the area about the unproductive tree.

Foresters also need to be able to selectively remove trees and tree stumps in rugged and relatively inaccessible areas to clear, for example, recreational paths without disturbing the surrounding environment. Finally, landscapers need to be able to remove trees and tree stumps without disturbing neighboring trees and shrubs or the lawn. Present methods, as discussed hereinabove, are not satisfactory in these situations.

The prior art does contain hydraulically activated devices suitable for the removal of posts, trees, and tree stumps. U.S. Pat. No. 3,526,387 discloses a post puller comprised of a frame with a horizontal bar pivotally attached to the frame at one of the ends of the horizontal bar, a chain attached to the opposite end of the horizontal bar and a hydraulic cylinder with a piston to activate the horizontal bar. In operation, the chain engages the post or other object to be removed from the ground. After attachment, the hydraulic cylinder raises the piston which in turn moves the bar upwardly. This movement causes the bar to pivot upwardly, pulling the chain and the engaged post with it.

U.S. Pat. No. 1,194,214 discloses a stump extractor comprising a frame that supports a hydraulic cylinder with a generally downwardly projecting piston. The cylinder is engaged with the frame through the use of a ball joint allowing the cylinder to pivot out of vertical position. Depending from the piston is an eye, which in turn is attached to the stump. In operation, the hydraulic cylinder is operated, pulling the piston generally upwardly, which, in turn, pulls the cable, pulley, and the stump upwardly from the ground.

Other examples of hydraulically activated tree and tree stump pullers are shown in U.S. Pat. Nos. 226,884, 4,802,663, 3,823,916, and 4,244,560.

Despite the above-identified devices, there exists a real need for a tree and tree stump removal apparatus that is lightweight, compact, economical to manufacture and easy to use, but which is durable and strong enough to remove tree and tree stumps quickly and easily.

SUMMARY OF THE INVENTION

The present invention has met the above described need. The tree and tree stump removal apparatus consists of a frame, pivotally mounted hydraulic means mounted thereon, and associated engagement means that wraps around or otherwise engages a tree or tree stump. The hydraulic means is pivotally mounted to the frame to provide optimum vertical pulling power in order to quickly and effectively remove trees or tree stumps and their associated roots. The apparatus is lightweight and easily transported and is adapted for easy connection to numerous hydraulic systems.

It is an object of the invention to provide a cost-effective and efficient method of removing trees and tree stumps along with their associated roots.

It is a further object of this invention to provide a tree and tree stump removal apparatus that effectively removes trees or tree stumps with minimal damage to the landscape.

It is a further object of this invention to provide a tree and tree stump removal apparatus that is lightweight and easy to transport in order to facilitate use of the equipment in rugged or relatively inaccessible terrain.

It is a further object of this invention to provide a tree and tree stump removal apparatus that is economical to manufacture.

It is a further object of the invention to provide a tree and tree stump removal apparatus with hydraulic means that can be easily and quickly connected to an outside power source.

It is a further object of the invention to provide a tree and tree stump removal apparatus that can be mounted by means of a three point hitch to a small tractor or the like.

It is a further object of the invention to provide an apparatus that has pivotable hydraulic means that aligns itself to achieve optimum vertical pulling power for efficient tree or tree stump removal.

These and other objects of the invention will be more fully understood from the following description of the invention on reference to the illustrations appended hereto.

BRIEF DESCRIPTIONS OF THE DRAWINGS

DESCRIPTION OF THE PREFERRED EMBODIMENT

Figure 1:
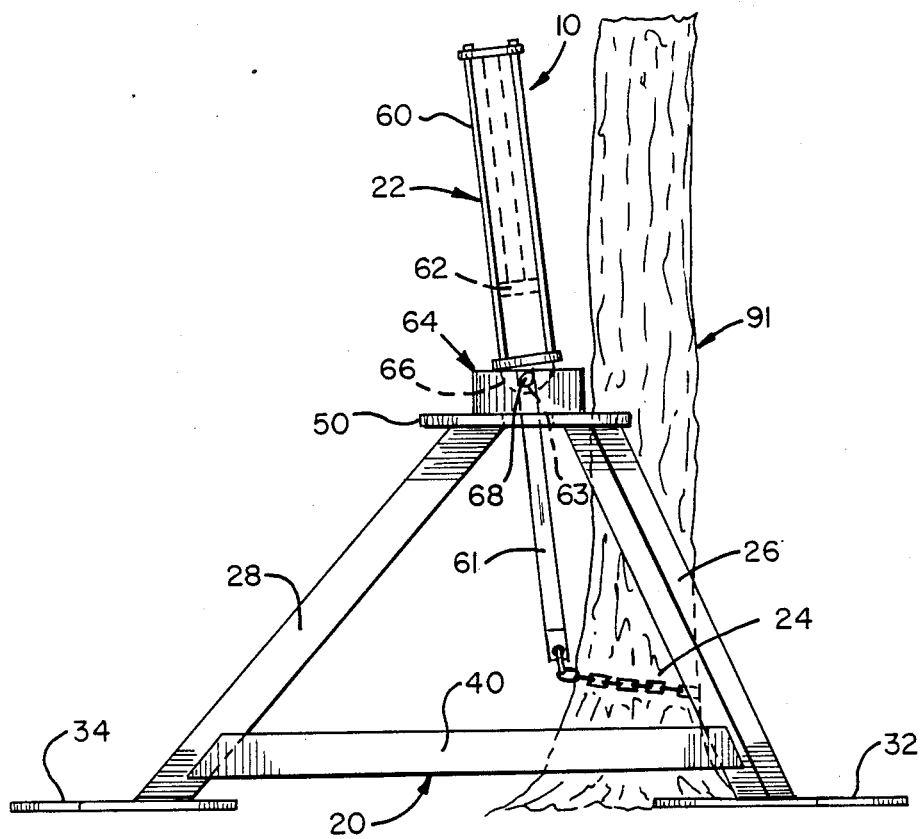
FIG. 1 is a schematic elevational view of the tree and tree stump removal apparatus of the present invention.
Figure 2:
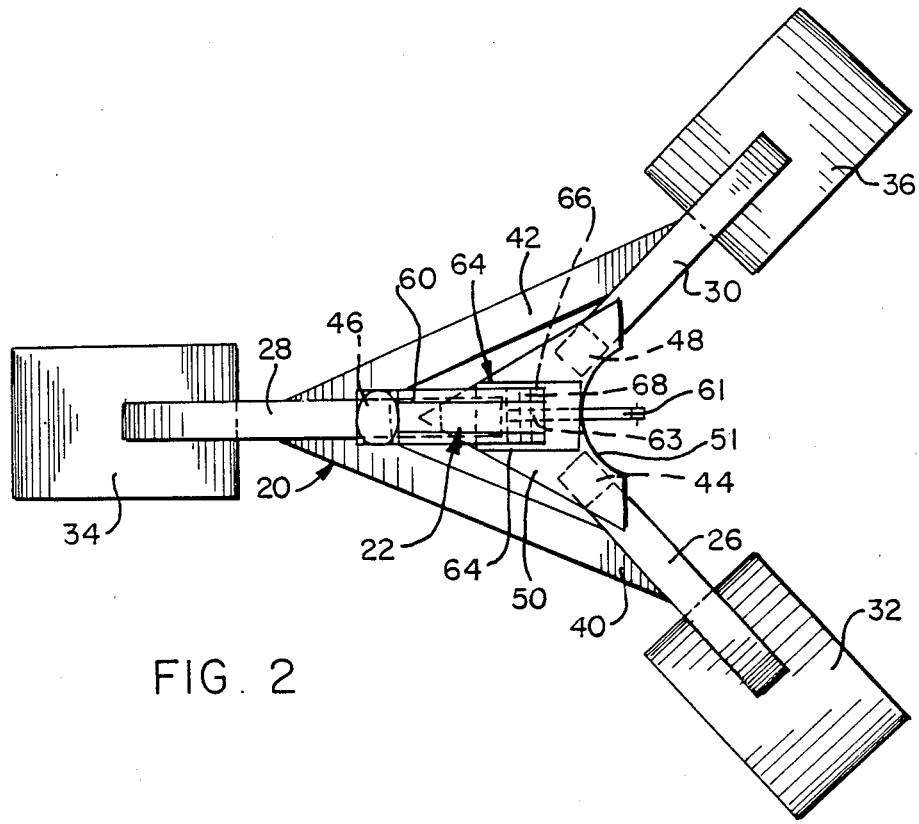
FIG. 2 is a bottom plan view of the apparatus of FIG. 1.

For purposes of this specification, the term "tree" includes, but is not limited to, trees, tree stumps, and other forms of vegetation, living or dead, including those engaged within soil or other material. Also included in this definition are posts made of wood or other materials.

Referring now in greater detail to FIGS. 1 through 4, there is shown the tree and tree stump removal apparatus 10 which consists of a support frame 20, hydraulic means 22, and tree engagement means, which in the form shown is a chain 24, connected to the hydraulic means 22.

The frame 20 is preferably rigid and has a tripod arrangement having three elongated support members 26,28, and 30. Supporting feet 32,34, and 36 (as can best be seen in FIG. 2) are attached as by welding, for example, to the three elongated support members 26,28, and 30. The three support members 26,28, and 30 are preferably substantially rigid and are generally inclined inwardly and upwardly toward each other and toward the hydraulic means 22. Horizontal stabilizing bars 40 and 42 are also provided. Bar 40 is attached, as by welding, for example, to support members 26 and 28 and bar 42 is attached, also by welding, to support members 28 and 30. The upper ends 44,46, and 48 of the respective support members are secured, as by welding, for example to a triangular plate 50. The triangular plate has a circular recess 51 to facilitate removal of the tree. The frame 20, support members 26,28, and 30, feet 32,34, and 36 and bars 40 and 42 can be made of any material of suitable strength such as steel or aluminum for example. It will be appreciated that the apparatus can have more than three supporting members, if desired.

It will be appreciated that the feet 32,34 and 36 provide a sliding surface for engagement with the ground to facilitate easy transport of the apparatus. If desired, wheels or casters or other means can be attached to the feet to provide even more ease of mobility.

Figure 5:
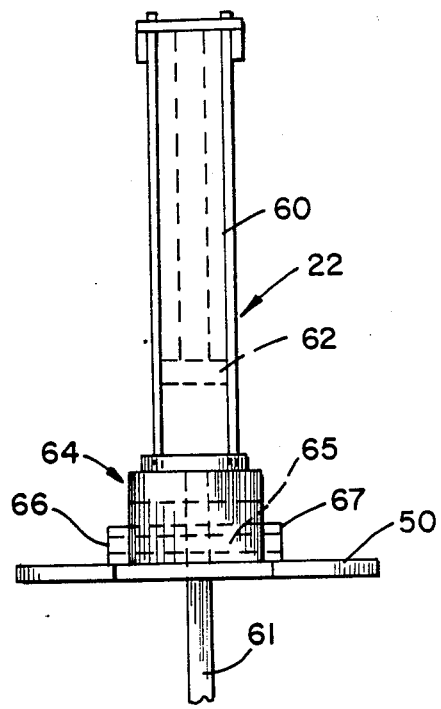
FIG. 5 is an enlarged front elevational view of the pivotable mounting for the hydraulic cylinder of the invention.

The hydraulic means 22 is secured in overlying relationship with respect to the plate 50 as by welding or the like, as can be seen in FIGS. 1 and 5. The hydraulic means 22 consists of a cylinder 60 having a piston 62, said piston being operatively associated with and extending axially from a strut means 61. The cylinder 60 preferably has a six inch diameter and a twenty four inch stroke and may be of any conventional brand or type. A suitable source of hydraulic fluid such as a small tractor and conventional controls, such as are well known to those skilled in the art, provides the hydraulic fluid pressure to operate the cylinder 65 as will be discussed hereinbelow.

Figure 3:
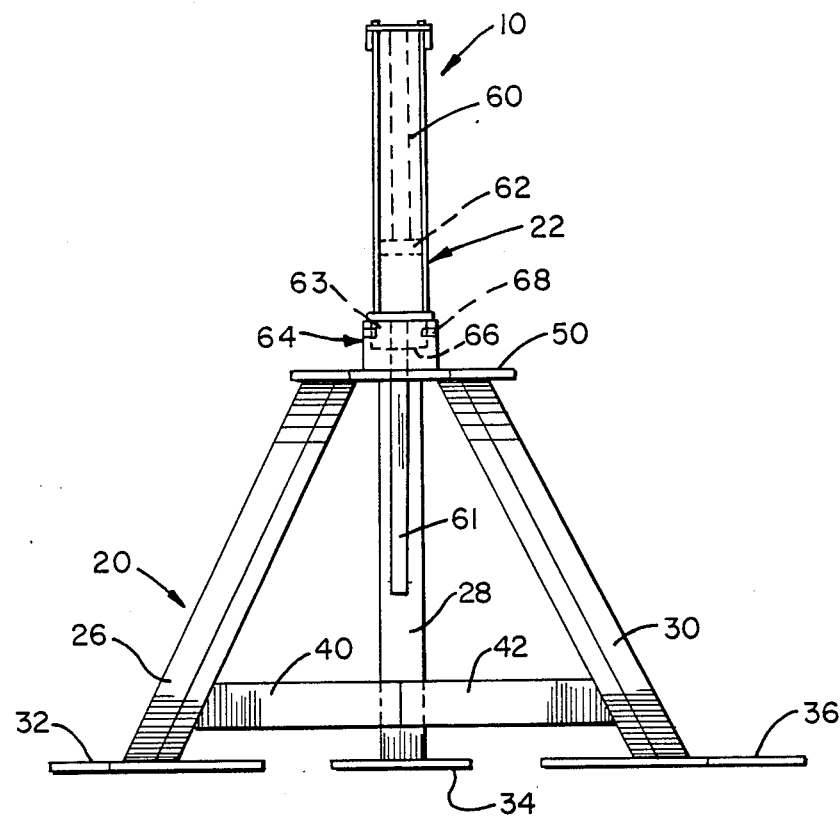
FIG. 3 is a right side elevational view of the invention.
Figure 4:
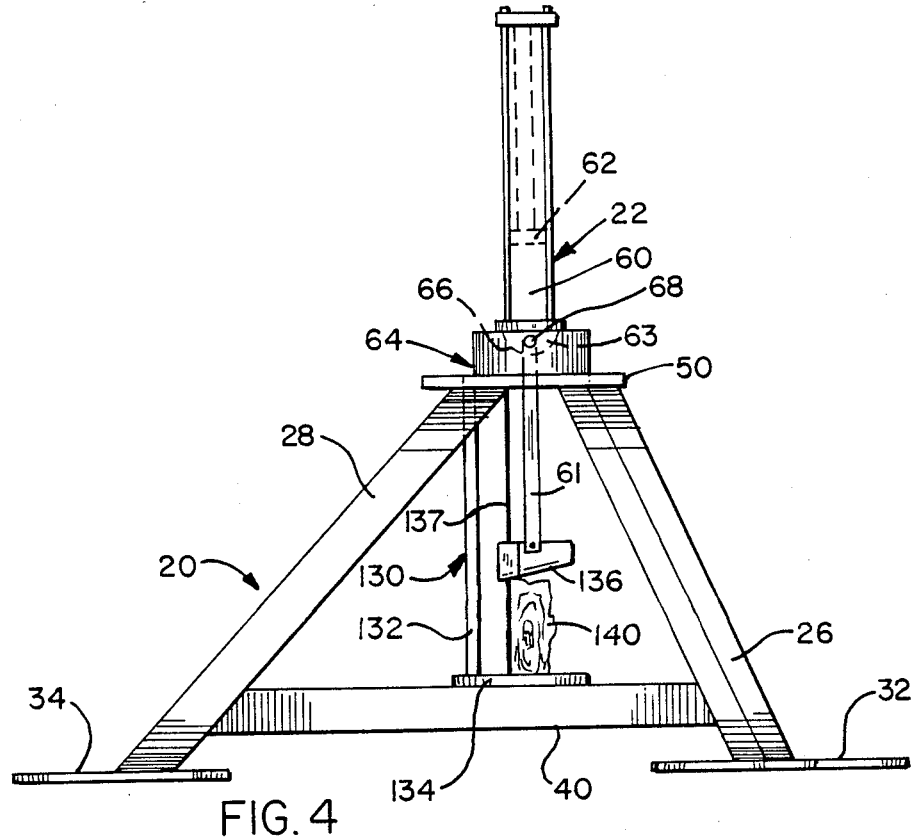
FIG. 4 is a schematic side elevational view of the invention equipped with an optional log splitter means.

As can best be seen in FIGS. 1, 3, and 4, the cylinder 60 preferably terminates in a semi-circular housing end 63 which is in turn engaged in a recessed pivot means 64 having a shape generally complementary with respect to housing end 63. The pivot means 64 preferably consists of a pivot cup 66 mounted on the triangular plate 50 which cradles and surrounds the semi-circular housing end 63. A pivot bar 68 secures the cylinder 60 into the pivot cup 66 while also allowing the cylinder 60 to pivot in the pivot cup 66. This can best be seen in FIG. 5. The hydraulic means 22, in this embodiment, pivots only in one plane, however, it will be obvious to those skilled in the art that other pivoting means which allow greater freedom of movement of the hydraulic means can be provided.

Figure 6:
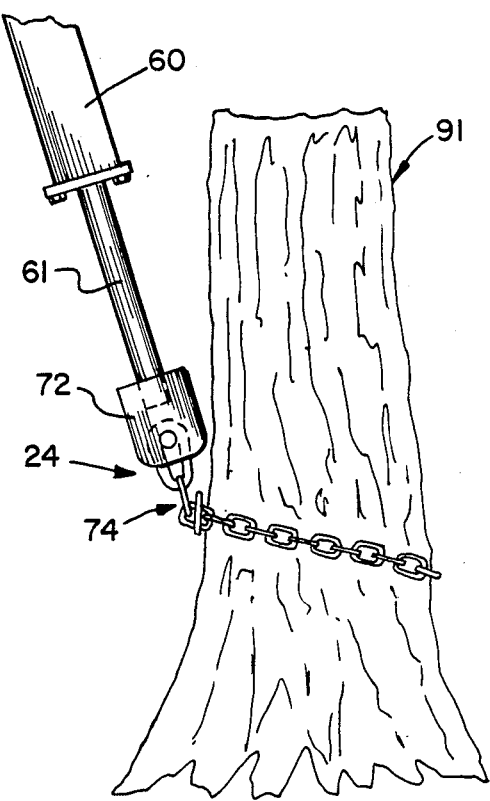
FIG. 6 is an enlarged view of a portion of the tree engagement means of the invention.
Figure 6A:
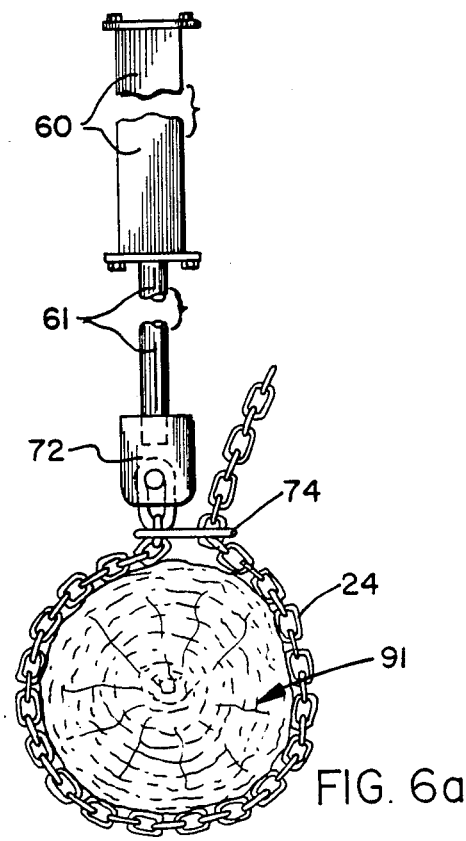
FIG. 6a is an enlarged top plan view showing the tree engagement means.
Figure 6B:
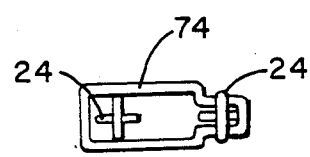
FIG. 6b is a detailed view of the chain ring means.

As can best be seen in FIGS. 1, 6, 6a, and 6b, the tree engagement means 24, which in the form shown is a chain, is preferably attached to the strut 61 by means of a yoke 72. The yoke 72 may be attached to the strut 61 as by welding or may be integrally formed with the strut 61. The yoke 72 is attached to the chain 24 by means of a chain ring 74. The chain ring 74 engages the links of the chain 24 as shown in FIG. 6b. The chain ring 74, then can be adjustable to different sizes of trees. It will be known to those skilled in the art that the chain should tightly engage the tree so as to minimize slack which will in turn increase the effectiveness of the apparatus 10. It will be appreciated that other methods of securing the chain 24 to the strut 61 may be provided, such as providing a hole in the strut and passing the chain 24 through the hole and then engaging the chain 24 around a tree.

It can be appreciated by those skilled in the art that alternate tree engagement methods can be provided such as adjustable wire slings or wire rope for example and that these engagement means may be attached to the strut 61 by welding or by other attachment means.

The apparatus 10 is preferably mounted by three point hitch to a small tractor (not shown). Such three point hitches are well known to those skilled in the art and are disclosed in American Society of Agricultural Engineers Standard: ASAE S217.10 (SAE J715 May 80). The tractor preferably provides the hydraulic power necessary to operate the hydraulic means 22. Preferably, hydraulic hoses (not shown) associated with the hydraulic system of the tractor can be connected to the hydraulic means 22 of the tree and tree stump removal apparatus.

In operation, as shown in FIG. 1, the tree engagement means 24 is attached to a tree 91 and the hydraulic means 22 is connected to the tractor. Activating the hydraulic means 22 retracts the piston 62 and strut 61 into the cylinder 60 and a generally vertical pulling force is exerted on the tree 91. Because of the pivot means 64, the hydraulic means 22 can align itself to achieve optimum pulling position which facilitates easy removal of the tree 91.

Figure 4A:
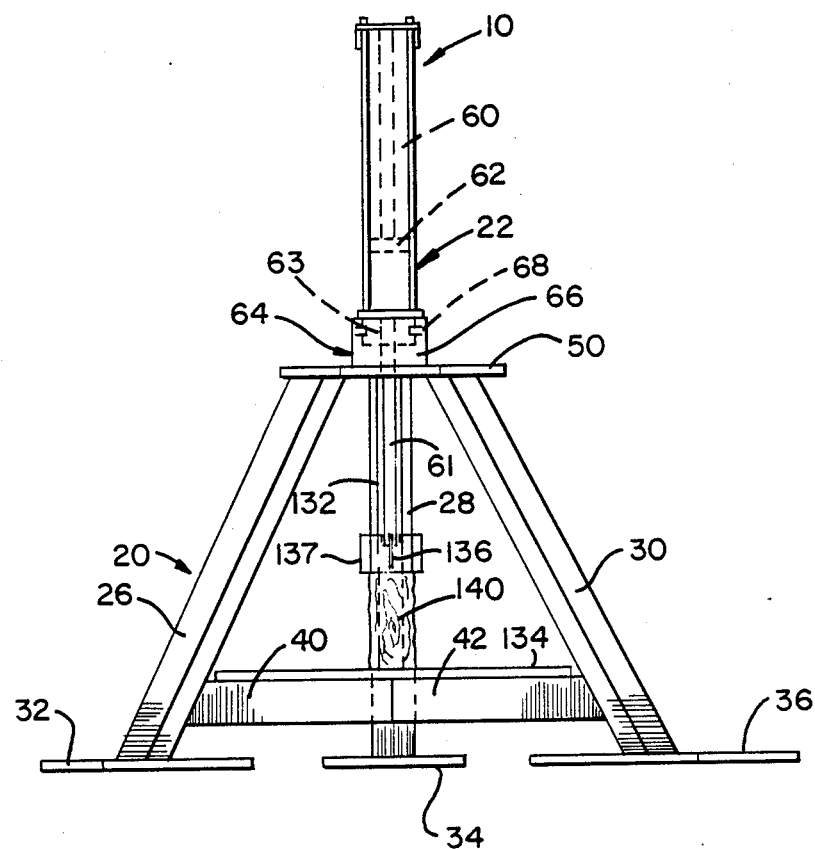
FIG. 4a is an enlarged front elevational view of the invention showing optional log splitter means.

The apparatus can also be equipped with log splitter means 130 as shown in FIG. 4. The log splitter means 130 consists of an I-beam 132, a bottom plate 134, and a knife or blade 136 which is attached to the strut 61 by any suitable means such as by blade guide means 137. The I-beam 132 depends form the triangular plate 50 and is attached to the bottom plate 134, as by welding, for example. The bottom plate 134, as can best be seen in FIG. 4a, straddles the stabilizing bars 40,42 and is, preferably, weldedly attached thereto. The I-beam 132 and bottom plate 134 can be made from the same materials as the frame 20, and can be integrally formed therewith, if desired.

In operation, a log 140 is placed on plate 134, and the blade 136 is thrust through the log 140 by the hydraulic means 22 pushing down the strut 61 and blade 136 to effect a chopping action which splits the log 140.

It will be appreciated that the apparatus can be provided with a self-contained hydraulic power source so that it can operate independently of an outside power source.

It will be appreciated that the method of this invention is to provide a tree and tree stump removal apparatus 10, placing the engagement means 24 around a tree or tree stump and providing hydraulic pressure to the pivotable hydraulic means 22 in order to lift the tree or tree stump and its associated roots out of the ground. The pivotable hydraulic means 22 automatically aligns itself to provide optimum pulling power to cleanly and efficiently lift the tree and its associated roots out of the ground.

Whereas particular embodiments of the invention have been described for purposes of illustration, it will be evident to those skilled in the art that numerous variations of the details may be made without departing from the invention as defined in the appended claims.

We claim:

1. A tree removal apparatus comprising
   a frame having its upper portion spaced from a lower portion,
   pivotally mounted hydraulic means secured near said upper portion of said frame including a cylinder, a piston reciprocable within said cylinder, strut means operatively associated with said piston and extending axially therefrom, and pivot means for permitting rotation of said cylinder relative to said frame, and
   engagement means secured to said strut means to engage a tree, whereby said pivotally mounted hydraulic means will apply a generally upward force to said tree through the engagement means in order to effectively lift said tree along with its associated roots out of the ground.

2. The apparatus of claim 1, including
   said frame consisting of a plurality of upwardly projecting and generally inclined support members each secured at their lower end to separate supporting feet members and positioned so that each said support member is secured at or adjacent their respective upper ends to a common plate means and a plurality of horizontal stabilizing bars secured to a pair of support members at a point intermediate said upper and lower ends of said support members.

3. The apparatus of claim 2, including
   said frame made from a material selected from the group consisting of steel and aluminum.

4. A tree removal apparatus comprising
   a frame having its upper portion spaced from a lower portion,
   hydraulic means pivotally secured near said upper portion of said frame including strut means,
   said pivotally mounted hydraulic means including a cylinder, a piston reciprocable within said cylinder, strut means operatively associated with said piston, and pivot means for permitting rotation of said cylinder,
   said pivot means including a pivot cup in which one of said hydraulic cylinder is rotatably secured, and
   engagement means secured to said strut means to engage a tree, whereby said hydraulic means is able to pivot to provide efficient lifting power to lift said strut means and said engagement means and thereby pull said tree and its associated root out of the ground.

5. The apparatus of claim 4, including
   said strut means having connection means for attaching said engagement means to said strut means.

6. The apparatus of claim 5, including
   said connection means comprising a yoke means being secured to chain ring means, whereby said engagement means is attached to said strut means by said engagement means being secured to said yoke means.

7. The apparatus of claim 6, including
   said engagement means consisting of a chain.

8. The apparatus of claim 6, including said engagement means consisting of a wire sling cable.

9. The apparatus of claim 1, including
   said strut means being pivotable with respect to said frame.

10. The apparatus of claim 1, including
    said strut means fixedly secured to said cylinder.

11. The apparatus of claim 1, including
    said frame including three point hitch mounting means whereby said apparatus can be transported by and connected to a tractor.

12. A method of removing trees comprising
    providing a tree removal apparatus having a frame with an upper portion spaced from a lower portion and having a plurality of upwardly projecting and generally inclined support members secured at their upper ends to common plate means and secured at their lower ends to separate supporting feet members, pivotally mounted hydraulic means secured near said upper portion of said frame including a cylinder, a piston reciprocable with said cylinder, strut means operatively associated with said piston and extending axially therefrom and pivot means for permitting rotation of said cylinder relative to said frame, and engagement means associated with said hydraulic means,
    placing said engagement means around said tree,
    providing hydraulic pressure to said hydraulic means, and
    pivoting said hydraulic means to provide lifting force to retract said strut means and thereby move said engagement means and lift said tree and its associated roots out of the ground.

13. The method of claim 12, including
    adjusting said engagement means so that it may be in intimate contact with said tree.

14. The method of claim 13, including
    providing said tree removal apparatus with an hydraulic power source.

15. The method of claim 13, including
    providing said hydraulic pressure from an outside source.

16. The method of claim 15, including
    mounting said tree removal apparatus to a vehicle by three point hitch means.

17. The method of claim 16, including
    transporting said tree removal apparatus to said trees to be removed.

* * * * *

UNITED STATES PATENT OFFICE
CERTIFICATE OF CORRECTION

PATENT NO. : 4,893,783

DATED : January 16, 1990

INVENTOR(S) : ROBERT G. DIENER ET AL.

It is certified that error appears in the above-identified patent and that said Letters Patent is hereby corrected as shown below:

Col. 1, line 64, "4,802,663" should be --3,802,663--.

Col. 3, line 54, "cylinder 65" should be --cylinder 60--.

Claim 4, col. 5, line 58, --end-- should be inserted before "of said hydraulic".

Claim 4, col. 6, line 1, "root" should be --roots--.

Claim 12, col. 6, line 34, "with" should be within--.

Signed and Sealed this

Eighth Day of September, 1992

Attest:

DOUGLAS B. COMER

*Attesting Officer*     Acting Commissioner of Patents and Trademarks